Patented Mar. 12, 1935

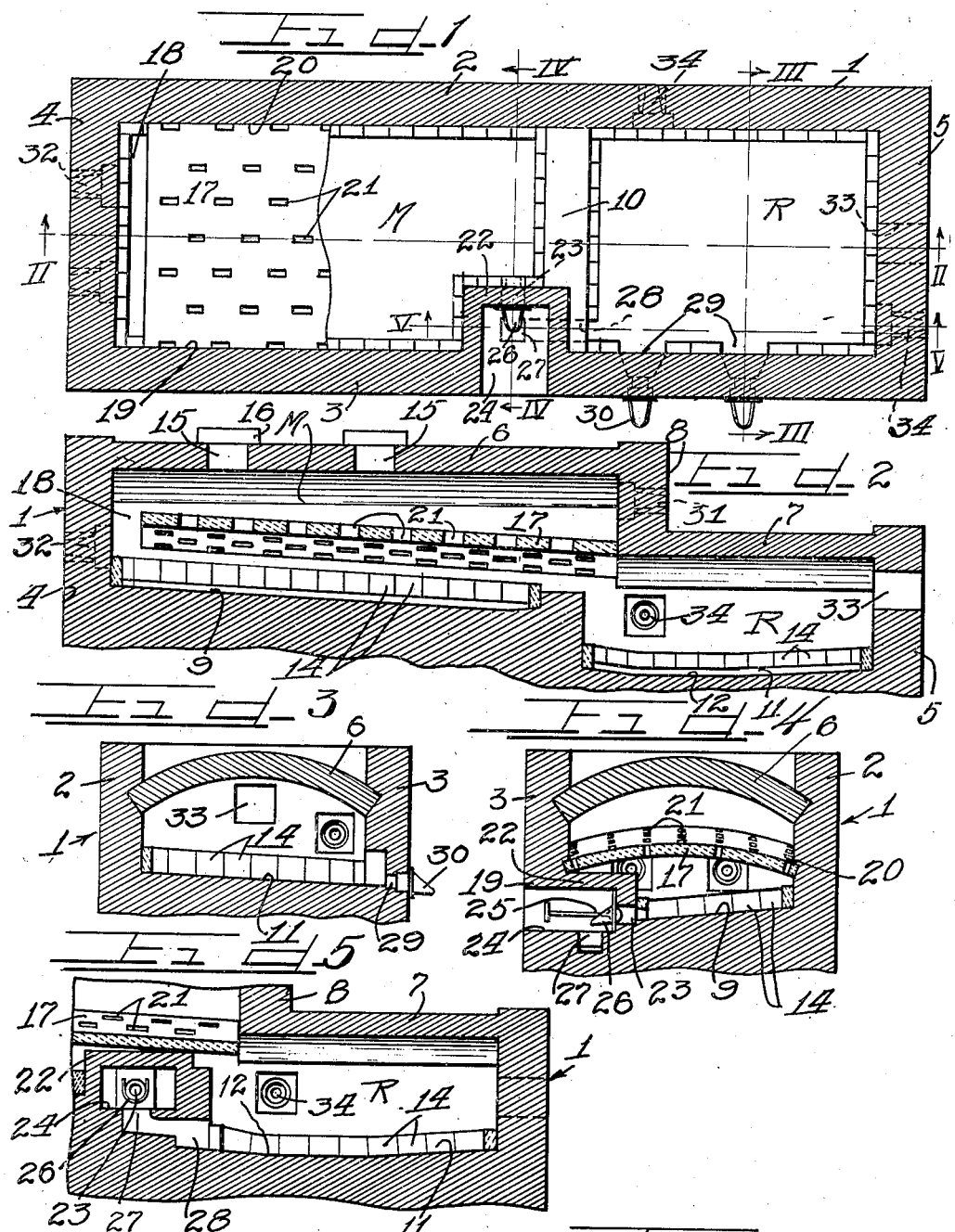

1,993,964

UNITED STATES PATENT OFFICE 1,993,964

APPARATUS FOR AND METHOD OF PREPARING FUSED MATERIALS

William Hogenson, Hinsdale, Ill., assignor to Chicago Vitreous Enamel Products Co., Chicago, Ill., a corporation of Illinois Application December 12, 1932, Serial No. 646,823

16 Claims. (Cl. 49—54)

This invention relates to an apparatus for and a method of preparing fused materials and more particularly relates to the manufacture of enamels, such as vitreous enamel or porcelain enamel, and various kinds of glass, or similar materials.

In the manufacture of vitreous and porcelain enamels, glass and the like, various refractory materials are used together with fluxing agents, opacifying agents and the like to form a fused mass and this mass, in the case of enamels, after being properly refined is quenched in water to produce a finely divided solid product. Heretofore, in the manufacture of enamels, it has been the practice to employ a single chamber furnace unit, in which the chemicals are first fused at high temperatures and then refined in the same chamber at lower temperatures. It has further been the practice to melt down or fuse the chemicals on a solid floor or bottom wall of a furnace chamber by means of flames and hot gases playing over the surface of the chemicals. One of the serious disadvantages of these previous practices is that it is difficult if not impossible to apply heat to the chemicals uniformly, owing largely to the fact that the bottom wall or floor on which the chemicals rest is protected from the heat of the hot gases after the chemicals have been charged upon it and therefore this bottom wall or floor cools rapidly during the charging and early part of the fusion step. This lack of uniformity in the heating of the chemicals results in a loss of quality or opacity in the products. Also, there is a considerable loss in time and in heat economy where only a single chamber unit is employed.

A great many attempts have heretofore been made to utilize apparatus having multiple chambers but, to the best of my knowledge, no suitable means or method has been developed prior to my present invention whereby a batch may be held in one chamber until the proper time for conditioning or refining and then the batch transferred in its entirety to another chamber for the conditioning or refining steps. For instance, if the arrangement of chambers were such that the molten materials would run from one chamber to the other whenever portions of the materials in the first chamber became sufficiently fluid, a separation of raw chemicals in improper proportions would take place. It is, of course, essential that the chemicals be fused together in the proportions in which they are initially mixed and that the more easily fusible ingredients or fluxing constituents be not allowed to become separated from the other ingredients during the fusion step. For this reason, it is very important that the fusion step be carried out rapidly and that the chemicals be uniformly melted throughout the entire charge without substantial separation or dissipation of any of the ingredients.

It is, furthermore, extremely desirable, in order to obtain opacity or density in the enamel products, to remove the fused mass from the high temperatures employed in the fusion step as rapidly as possible after the mass has reached a flowable stage. Where the chemicals are melted down by the heat from flames and hot gases playing over the top of the chemicals only, the top portions of the batch of chemicals reach an unnecessarily high temperature before the whole batch is fused or converted into a flowable stage. This, as previously pointed out, results in a loss of opacity in the case of vitreous or porcelain enamels.

It is therefore an object of this invention to provide a multiple chamber apparatus for use in the manufacture of porcelain and vitreous enamels, glass and the like, wherein means are provided for rapidly and uniformly fusing the chemicals and withdrawing the chemicals from the high temperatures at substantially the same rate as the fusion proceeds.

It is a further important object of this invention to provide a furnace for the melting and refining of enamels and the like wherein the batch of chemicals is supported in a relatively thin layer to which heat is applied both from above and from below and from which the fused portions of the batch may drop as fusion progresses, whereby more uniformly high temperatures can be maintained throughout the mass of the batch and the batch more quickly fused without loss of opacity.

It is a further important object of this invention to provide a multiple chamber furnace having continuous gas flow communication between the chambers to utilize more completely the heat values of the fuel used and to provide means for withdrawing the fused batch in its entirety from the melting chamber to the conditioning or refining chamber while controlling the temperatures in both chambers substantially independently of each other.

It is a further important object of this invention to provide a multiple chamber furnace wherein given size batches may be rapidly and uniformly melted in the melting chamber and then withdrawn in their entirety to the conditioning or refining chamber and there subjected to properly controlled temperatures.

Other and further important objects of this invention will become apparent from the following description, the drawing and appended claims.

On the drawing:

Figure 1 is a horizontal sectional view of apparatus embodying the principles of my invention.

Figure 2 is a broken, vertical sectional view, taken substantially along the line II—II of Fig. 1.

Figure 3 is a fragmentary sectional view taken substantially along the line III—III of Fig. 1.

Figure 4 is a fragmentary sectional view taken substantially along the line IV—IV of Fig. 1.

Figure 5 is a fragmentary sectional view taken substantially along the line V—V of Fig. 1.

As shown on the drawing:

The reference numeral 1 indicates the main housing of a furnace for use in the manufacture of porcelain and vitreous enamels, glass and similar materials. Said housing 1 may be suitably constructed of refractory material, such as is commonly used in the construction of furnaces of this type. It will be understood that although the housing is illustrated as being of a unitary or monolithic construction, it is preferably formed from fire bricks or the like. The general form, shape and size of the housing 1 may be varied considerably, but preferably the housing is rectangular in horizontal section, relatively long and narrow and relatively low in height. The housing 1 comprises longitudinally extending side walls 2 and 3, end walls 4 and 5 and stepped top walls 6 and 7. Said top walls 6 and 7 are joined by a secondary end wall 8 and are preferably of arched construction. Said furnace housing 1 is divided internally into a melting chamber M and a refining chamber R in gas flow communication with said chamber M. Said chamber M is provided with a sloping floor 9 that slopes downwardly away from the end wall 4, and a transverse abutment 10 is formed at the lower end of said floor 9. The refining chamber R is provided with a floor 11 that slopes from both ends toward a middle side portion 12, toward which said floor 11 also slopes from the other side wall 2. The floors 9 and 11 are separated by the transverse abutment 10 and are at considerably different levels to permit the fused batch to be run from the chamber M into the chamber R, as will later be explained. Both of the floors 9 and 11 and the vertical walls for a short distance thereabove are lined with bricks or tiles of especially refractory material, as indicated at 14.

The top wall 6 of the melting chamber M is provided with a plurality of charging openings 15, through which the chemicals may be introduced into the melting chamber. Suitable closures 16 for said charging openings 15 may be used after the chemicals have been introduced to prevent loss of heat through the openings. A charge receiving floor 17 is positioned in spaced relation beneath the top wall 6 and above the floor 9 and extends for substantially the full length of the melting chamber M but terminates adjacent the end wall 4 to provide a gas passage 18. Said charge receiving floor or platform 17 is preferably of arched construction and preferably slopes upwardly toward the end wall 4. The platform 17 may, however, be flat, if desired, and may be made up of a series of platforms or a series of projections from the side walls, or, if arched, may be a series of arches divided either longitudinally or transversely. One of the main advantages of an arched construction is a structural one, in that the arched flooring or platform 17 may be supported marginally along its longitudinal edges, as at 19 and 20, with or without intermediate piers or other forms of support, whereas a flat platform requires a considerable number of piers to support it and, in general, deteriorates more rapidly.

The charge receiving platform 17 receives the charge that is directly fed through the openings 15 into the melting chamber M. Said platform 17 is provided with a large number of apertures, slots or other forms of openings 21 through which the chemicals may flow after they have become fused. From the platform 17, the fused chemicals drop down onto the floor 9 and when substantially the entire batch has been fused and run onto said floor 9, the batch is withdrawn in its entirety into the conditioning and refining chamber R.

For this purpose, the housing side wall 3 is provided with an indented wall portion 22 which juts into the smelting chamber M adjacent the abutment 10 and is apertured to provide a draw-off passage 23. Said passage 23 opens into a recess 24 formed by the indented wall portion 22 in the side wall 3 and the outer end of said passage 23 is normally closed by means of a clay plug 25 or other suitable form of closure. A spout 26 directs the fused material flowing through the passage 23 into a trough 27, from which a passage 28 opens into the refining chamber R. Said refining chamber R is provided with one or more taps or draw-off passages 29 provided externally with spouts 30 for discharging the refined and conditioned material into a trough or vat of water, where the material is to be quenched.

The secondary end wall 8 is provided with one or more openings 31 through which a flame may be introduced into the melting chamber M. Any suitable fuel, such as oil or gas, may be burned and the flame projected through the opening or openings 31. The flame and hot gases travel lengthwise of the melting chamber M toward the end wall 4 and pass downwardly around the end of the platform 17 through the end passage 18. One or more openings 32 are preferably provided in said end walls 4 at a level below the platform 17 to permit a flame or flames to be introduced into the gas passage beneath said platform 17, in order to control the temperature therein and also the temperature of the platform 17.

The gases flow from the melting chamber beneath the platform 17 over the abutment 10 and into the refining or conditioning chamber R, from which the gases are vented through a passage 33 into a stack (not shown).

One or more openings 34 is also provided in the wall 2 of chamber R and in the end wall 5 thereof so that temperatures within the refining chamber can be controlled at the desired degree. It will be understood that all of these openings, 31, 32 and 34, may be closed to prevent dissipation of heat from within the furnace when they are not being used to introduce a heating medium.

In operation, the furnace is first brought to a heated condition by means of flames introduced through the openings 31, which may or may not be supplemented by flames introduced through the openings 32. The platform 17 is quickly brought to a high temperature by virtue of the flames and hot gases that are played over its surface and that pass in contact with its under surface on their way to the stack. The necessary amount of properly proportioned chemicals to give the desired size batch is then introduced through the charging openings 15 and loaded onto the charging platform 17 to give a relatively thin layer, about 3 to 10 inches in thickness, of chemicals over the surface of said platform. The charged mass of chemicals temporarily seals the perforations or apertures 21 in the loading platform 17, but as soon as the chemicals start to fuse, portions of semi-fluid chemicals trickle through the apertures 21 and drop through the flow of gases beneath the platform 17 onto the floor 9. The constant flow of hot gases passing underneath the platform 17 and radiating heat through the platform and through the openings 21 provided for the purpose into the unmelted materials greatly assists in the rapidity of melting the batch. Furthermore, the simultaneous application of heat to the top and bottom of the mass or layer of chemicals on the platform 17 results in a more uniform heating of the mass as well as a quicker fusion of the chemicals.

The platform 17 is pitched so that the chemicals as they become melted, will flow counter to the direction of the flow of gases above said platform and will thus be rapidly brought to a sufficiently fluid condition to discharge through the apertures 21. The fused or molten chemicals are thus discharged from the zone of highest temperature almost as quickly as they become sufficiently fluid to flow through the apertures 21. Furthermore, the more readily fusible constituents of the batch, which will be the first to trickle through the perforations 21, will be somewhat cooled in passing through the flow of gases beneath the platform 17 so that a large proportion of any volatilized substances will be caught in the pool that forms on the flooring 9 beneath said platform 17. The droplets or streams of fused material in falling through the stream of gas beneath the platform 17 will also serve in some measure to precipitate and remove more volatile constituents carried along in the gases from the upper passage above the platform 17.

Further melting takes place on the floor 9 at a lower temperature than is necessary for the initial fusion of the chemicals on the platform 17. If any additional heat is required for this further melting, flames may be projected through the openings 32. When the batch has been properly melted and is ready to be tapped, the clay plug 25 is removed and the batch drawn off through the passage 23 for discharge from the spout 26 into the trough 27 and thence through the passage 28 into the refining chamber R. As soon as the entire batch has been withdrawn from the melting chamber into the refining chamber R, a new batch may be charged into the melting chamber while the previous batch is being properly conditioned and refined in the refining chamber. In this way, a substantial saving in time and in heat economy is made possible.

The conditioning, puddling or refining of the batch in the refining chamber R is carried out under lower temperatures than obtained in the melting chamber. Absolute temperature control within the refining chamber R is made possible through the provision of auxiliary flame introducing apertures 34. Owing to the lower temperatures obtaining in the refining chamber R, an additional portion of volatile chemicals is precipitated out in the forms of solids into the molten batch, thus reducing losses in chemicals and giving additional desirable properties to the finished product.

In the average batch of chemicals melted for obtaining vitreous enamel, according to previous practices, an approximate loss in weight of from 17 to 25% is experienced. A portion of this loss in weight is represented in the volatilized products carried along with the heated gases. According to the present invention, a portion of this loss in weight is believed to be reclaimed in the lower passageway of the chamber M and in the refining or puddling chamber R.

It will be evident from the foregoing description that the provision of a two chamber furnace unit results in a considerable saving both in time and in fuel and that the provision of a suspended platform, such as the apertured platform 17, also aids greatly in the saving of fuel because of the direct utilization of the heat of the gases in heating the platform from the underside and in directly heating the lower portions of the batch resting on the platform. Furthermore, my invention makes possible the preparation of an improved finished material, due to the fact that the molten mass is removed from the intense heat necessary for the initial melting by falling through the apertures in the platform 17 onto the bottom 9.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. A furnace for use in the preparation of enamels, glass or other similar materials, comprising a housing having melting and refining chambers at upper and lower levels respectively and in gas flow communication with each other, a multi-apertured charge receiving floor in said melting chamber in spaced relation to the top and bottom walls and one end wall of said chamber and a closure controlled passage for the flow of melted materials between said chambers.

2. A furnace for use in the preparation of enamels, glass or other similar materials, comprising a housing having melting and refining chambers at upper and lower levels respectively and in gas flow communication with each other and a closure controlled passage extending through a wall of said housing and having an externally visible channel portion for the flow of melted materials between said chambers.

3. In a furnace of the class described, a housing having a melting chamber and provided with an opening in an upper wall thereof for charging material into said chamber, a multi-apertured charge receiving floor of refractory material within said melting chamber, said floor being arched transversely and inclined longitudinally and marginally supported in spaced relation to the top and bottom walls and one end wall of said chamber to provide gas flow passages over and under said floor around the end space so provided.

4. A furnace of the class described, comprising a housing having a plurality of compartments in continuous gas flow communication and in controlled material flow communication and a suspended raw charge receiving floor in one of said compartments with its under surface exposed to said gas flow.

5. A furnace of the class described, comprising a housing having a plurality of compartments in continuous gas flow communication and in controlled material flow communication and a suspended charge receiving floor in one of said compartments with its under surface exposed to gas flow, said floor being apertured to permit molten portions of the charge to pass therethrough into the gas flow therebeneath.

6. A furnace of the class described, comprising a housing having a plurality of compartments in continuous gas flow communication and in controlled material flow communication, a suspended charge receiving floor in one of said compartments with its under surface exposed to gas flow, said floor being apertured to permit molten portions of the charge to pass therethrough into the gas flow therebeneath and a plug for closing said material flow communication operable externally of said housing.

7. A furnace of the class described, comprising a housing having a melting and a refining chamber in continuous gas flow communication and in controlled material flow communication with each other, said housing having flame admitting openings in opposite end walls of said melting chamber at different levels and a charge receiving floor in said melting chamber intermediate said levels and exposed on both its upper and lower surfaces to said gas flow.

8. A furnace of the class described, comprising a housing having a melting and a refining chamber in continuous gas flow communication and in controlled material flow communication with each other, said housing having flame admitting openings in opposite end walls of said melting chamber at different levels and a charge receiving floor in said melting chamber intermediate said levels and having a plurality of apertures for the passage of molten material into the path of flame and gases below said floor.

9. A furnace of the class described, comprising a housing defining an upper melting chamber and a lower refining chamber in gas flow communication with each other, an abutment between the floors of said chambers to prevent unrestricted material flow therebetween, said abutment and an adjacent housing wall having connecting passages including an externally visible trough portion forming a material flow communication between said chambers and a plug accessible from the outside of said housing for controlling said passages.

10. A furnace of the class described, comprising a relatively long housing defining a plurality of chambers having different floor levels, said chambers being in continuous gas flow communication, a charge receiving platform within one of said chambers spaced from the top, floor and one end thereof to provide an upper gas flow passage and a lower reverse flow gas passage in communication therewith at said one end and a controlled material flow passage from one floor level to another.

11. A furnace of the class described, comprising a relatively long housing defining a plurality of chambers having different floor levels, said chambers being in continuous gas flow communication, a charge receiving platform within one of said chambers spaced from the top, floor and one end thereof to provide an upper gas flow passage and a lower reverse flow gas passage in communication therewith at said one end and a controlled material flow passage from one floor level to another, said housing having charging apertures in a top wall above said platform and having flame admitting openings in the walls at opposite ends of said upper and lower gas passages.

12. A furnace of the class described, comprising a relatively long housing defining a plurality of chambers having different floor levels, said chambers being in continuous gas flow communication, a multi-apertured charge receiving platform within one of said chambers spaced from the top, floor and one end thereof to provide an upper gas flow passage and a lower reverse flow gas passage in communication therewith at said one end and a controlled material flow passage from one floor level to another.

13. The method of preparing enamels, glass and similar materials, which comprises supporting a charge in a relatively thin layer, passing hot gases over and beneath said charge to melt said charge, allowing parts of said molten charge substantially as soon as fusion occurs to drop through said gas flow beneath and periodically drawing off a molten mass of said charge, subjecting said molten mass as a batch unit to a heating treatment and quenching said mass in water.

14. In a method of preparing enamels, glass and similar materials, the steps of subjecting a supported, relatively thin layer of fusible material to a stream of hot gases passing above and beneath said layer to rapidly and comparatively uniformly heat and fuse said material and allowing molten portions of said material from said layer to drop through said stream of heated gases substantially as rapidly as the melting proceeds and to accumulate in a pool until substantially all of the material in said layer has been fused and added to said pool.

15. In a furnace for use in the preparation of enamels, glass or similar materials, a charge receiving floor of refractory material having spaced apertures of sufficiently small size and so spaced as to prevent a substantial amount of the charged material from passing therethrough until fusion of said charged material has occurred, said floor being marginally supported to provide extensive upper and lower surfaces for exposure to the flow of hot gases, means for introducing a fluid fuel for combustion above said floor and a refractory lined bottom wall for receiving the fused products resulting from the heating of said charged material.

16. In a furnace for use in the preparation of enamels, glass or similar materials, a charge receiving floor of refractory material having spaced apertures of sufficiently small size and so spaced as to prevent a substantial amount of the charged material from passing therethrough until fusion of said charged material has occurred, said floor being marginally supported to provide extensive upper and lower surfaces for exposure to the flow of hot gases, means for introducing a fluid fuel for combustion above said floor and a refractory lined bottom wall for receiving the fused products resulting from the heating of said charged material, said floor being spaced from the top and bottom walls of said furnace and from one end thereof to provide gas passages over and under said floor around the end space so provided.

WILLIAM HOGENSON.